Sept. 1, 1970 W. W. BEYDLER ET AL 3,526,784

SENSE AMPLIFIER AND SIGNAL LEVEL TRANSLATOR

Filed July 13, 1967

INVENTORS
William W. Beydler &
Edward R. Higgins.
BY
Donald R. Lackey
ATTORNEY 3,526,784

SENSE AMPLIFIER AND SIGNAL LEVEL TRANSLATOR

William W. Beydler, Laurel, and Edward R. Higgins, North Linthicum, Md., assignors to Westinghouse Electric Corporation, Pittsburgh, Pa., a corporation of Pennsylvania Filed July 13, 1967, Ser. No. 653,236
Int. Cl. H03k *19/08*
U.S. Cl. 307—208 5 Claims

ABSTRACT OF THE DISCLOSURE

A sense amplifier for a computer memory system of the type having a bipolar output to distinguish the binary "ones" and "zeros." The memory sense amplifier includes two integrated circuits, i.e., a current mode logic gate, which will be hereinafter referred to as a CML gate, and an operational amplifier. The CML gate includes a differential amplifier having dual input gates on one side, and a biased input on the other side. The operational amplifier, which has its band-width increased by negative feedback, is connected to a sense line or winding of the memory system, and one of the dual input gates of the CML gate is capacitively coupled to the output of the operational amplifier. A strobe source is connected to the other of the dual input gates of the CML gate, and the output of the CML gate is connected to a read register. The CML gate functions as a level translator, changing the current mode logic levels to diode-transistor logic levels (DTL) required by the read register, and as an AND gate, changing its output only when a binary "one" and a strobe pulse are present simultaneously at the dual input gates of the differential amplifier. Zero lever thresholding of the binary "one" signals during a strobe pulse is obtained by biasing the dual input gate connected to the operational amplifier at substantially the same level as the biased input side of the differential amplifier, using capacitive coupling to prevent the bias voltage from affecting the operational amplifier.

BACKGROUND OF THE INVENTION

Field of the invention

The invention relates to memory sense amplifiers for computers, and more specifically to memory sense amplifiers for computer memories of the type which provide bipolar pulses, with one polarity indicating a stored "one," and the opposite polarity indicating a stored "zero."

Description of the prior art

Computer memory systems of the magnetic core type, which provide bipolar pulses to distinguish stored "ones" and "zeros," require sense amplifiers having the capability of detecting minimum signals of about 3.0 millivolts at a multimegahertz repetition rate. Because of the complexity of sense amplifiers, they require a substantial amount of space when constructed of conventional discrete components, and memory systems with a large word length, or memory ssytems organized as a multiple word per access line, may become prohibitive in size when discrete components are used. Further, as the physical size of the memory system is increased, system performance is degraded due to noise pickup in the long interconnecting lines from the magnetic core memories to the sense amplifiers.

A solution to the size problem would be to custom design a single can or flat pack integrated circuit sense amplifier. This approach, however, is both costly and time consuming. Another approach to the size problem would be to interconnect commercially available integrated circuit functions to provide the desired sense amplifier. For example, a conventional approach might be to utilize an integrated circuit operational amplifier, and use negative feedback to overcome the disadvantage of having a narrow bandwidth in the open loop, high gain mode. Since increasing the bandwidth through negative feedback reduces the gain of the operational amplifier, an integrated circuit amplifier may then be used to amplify the signal to the magnitude required to successfully employ an integrated circuit threshold detector stage. Then, still another integrated circuit would be required to shift the level of the detected signal, for compatibility with the read register flip-flop voltages. Four integrated circuits would have to be assembled and interconnected for each sense amplifier.

It would be desirable to reduce the size of computer memory sense amplifiers through integrated circuitry, without custom designing a complete integrated circuit sense amplifier, by using standard commercially available integrated circuit functions. Further, the number of standard integrated circuit functions used should be minimized to reduce the cost and physical size of the sense amplifier to a minimum.

SUMMARY OF THE INVENTION

Briefly, the present invention is a memory sense amplifier which utilizes only two integrated circuits i.e., an operational amplifier and a level translator. The level translator is a current mode logic gate. The operational amplifier and CML gate are interconnected in a manner which overcomes the gain loss in the operational amplifier due to negative feedback, utilizing a new strobing arrangement which provides zero level thresholding of the small signals from the operational amplifier during strobe time. In addition to detecting the small signal levels from the operational amplifier during strobe time, the CML gate also functions as a two input AND gate, and a level translator, changing the CML gate logic levels to diode transistor logic levels (DTL). The output of the CML gate switches from one DTL level to another when a binary "one" signal from the operational amplifier and a strobe pulse from the strobing means coincide.

The CML gate has a differential amplifier input, and, in addition to the normal long tailed pair, has an additional emitter coupled input on one side of the differential amplifier. The two emitter coupled inputs on one side of the differential amplifier are connected to the operational amplifier and to the strobing means, respectively, and the output of the CML gate is conneceted to be responsive to both of the coupled inputs, switching between DTL levels only when the output connected to the operational amplifier receives a "one" signal simultaneously with the input connected to the strobing means receiving a strobe pulse. Zero level thresholding of the signals from the operational amplifier is obtained by similarly biasing the single input side of the differential amplifier, and the input on the other side of the differential amplifier which is connected to the operational amplifier. Thus, a very small "one" signal from the operational amplifier, occurring simultaneously with a strobe pulse, switches the output of the CML gate for the duration of the strobe pulse.

BRIEF DESCRIPTION OF THE DRAWINGS

Further advantages of the invention will become more apparent when considered in view of the following detailed description and drawings, in which.

DESCRIPTION OF THE PREFERRED EMBODIMENT

Memory systems of the type which indicate stored "ones" and "zeros" by bipolar signals, such as provided by nondestructive readout (NDRO) magnetic core memory systems which utilize orthogonal magnetic fields, provide small signals which must be detected and processed to provide signals suitable for operating flip-flops in the read register. The present invention teaches how the requisite detecting and processing functions may be accomplished by a memory sense amplifier which requires a very small amount of space, which utilizes a minimum number of conventional discrete components, and a minimum number of standard integrated circuit functions.

Figure 1:
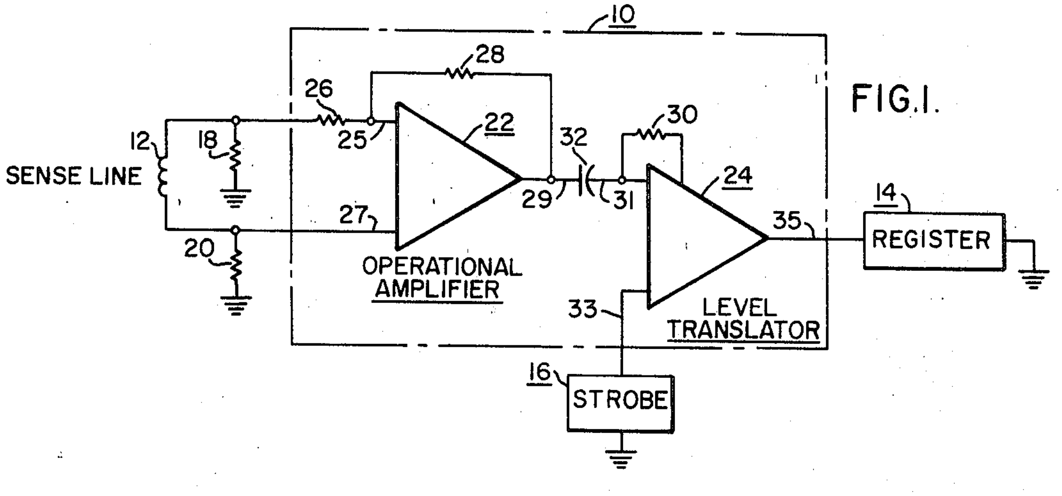
FIG. 1 is a schematic diagram of a memory sense amplifier constructed according to the teachings of the invention.

More specifically, FIG. 1 is a schematic diagram which illustrates a sense amplifier 10 constructed according to the teachings of the invention. Sense amplifier 10 has its input connected to a sense line 12 associated with a computer memory system of the type which provides polarized pulses upon interrogation, to indicate stored "ones" and "zeros." The memory system is not shown, as any memory system of this type may be utilized. The sense amplifier 10 has its output connected to a flip-flop in read register 14. Since any suitable read register may be used, it is shown in block form. A strobe 16 for providing narrow, timed voltage pulses of a predetermined magnitude at a predetermined repetition rate is provided to minimize the effects of noise voltages on the sense line 12. Since any suitable strobing means may be used, the strobe 16 is shown in block form for purposes of simplicity. Each end of the sense line 12 may be connected to ground through terminating resistors 18 and 20, and the strobe 16 and register 14 may also be grounded as shown in FIG. 1.

The sense amplifier 10 includes an integrated circuit operational amplifier 22, an integrated circuit level translator 24, and four conventional discrete components, i.e., resistors 26, 28 and 30, and a capacitor 32. The operation amplifier 22, which may be any suitable commercially available integrated circuit device having a large bandwidth in the closed loop mode, such as the Fairchild μA702A, is connected to the sense line 12 through conductor 25, resistor 26, and conductor 27. Negative feedback for the operational amplifier 22, which increases its bandwidth several megahertz while reducing its gain to about 40 db, is provided by resistor 28, which is connected from the output conductor 29 of the operational amplifier 22 to the input conductor 25. The operational amplifier 22 is used as a summing amplifier with a single input to yield precise gain. The gain is approximately the ratio of resistor 28 to resistor 26.

The output of the operational amplifier 22 is connected to an input of the level translator 24, indicated by conductor 31, through capacitor 32. Capacitor 32 is connected to conductor 29 of operational amplifier 22 and to the input conductor 31 of the level translator 24. The input conductor 31 of level translator 24 is connected to a bias supply in the level translator through resistor 30, as will be hereinafter described.

Another input to the level translator 24, indicated by conductor 33, is connected to the strobe 16. The output of the level translator, indicated by conductor 35, is connected to the read register 14.

Figure 2:
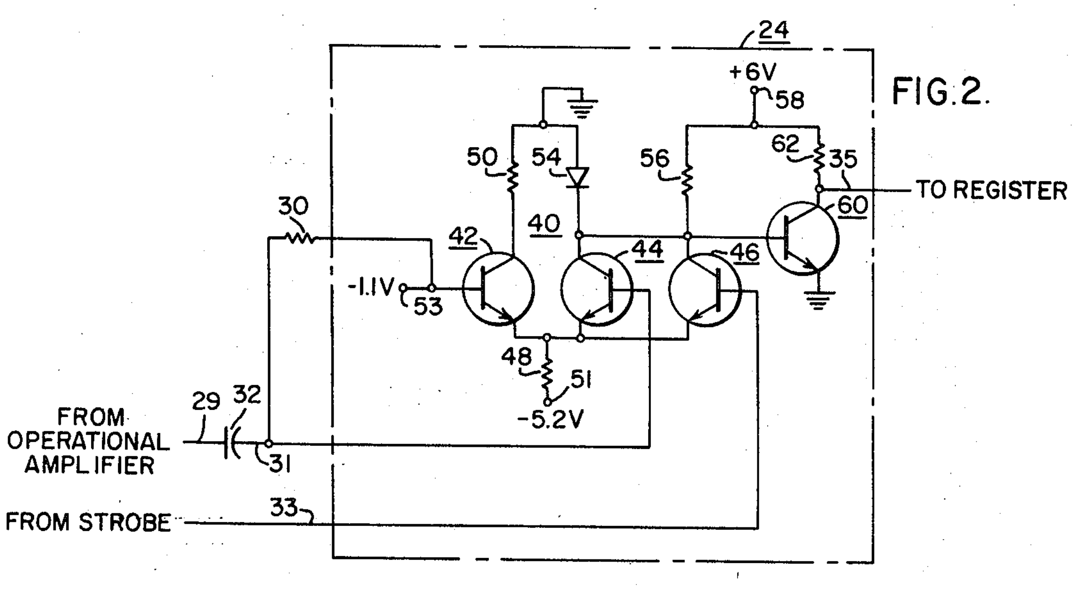
FIG. 2 is a schematic diagram of a level translator constructed according to the teachings of the invention.

The level translator 24, shown in detail in FIG. 2, is a current mode logic gate, which translates current mode logic levels, such as −0.7 volt and −1.5 volts, to diode-transistor logic levels (DTL) such as zero volts and +6.0 volts, for operation of its associated read register flip-flop.

More specifically, FIG. 2 shows the integrated circuit level translator 24 schematically, as it would appear if constructed with discrete components, and its construction and functions will be described in this manner in order to facilitate the understanding of its functioning in the present invention.

Level translators 24 includes a differential amplifier 40 having first and second input sides, with at least one of its input sides having first and second parallel connected input gates; and, an output gate whose conductive state is responsive to the differential amplifier. More specifically, one of the input sides of differential amplifier 40 includes an NPN transistor 42, and the other input side includes two NPN transistors 44 and 46 connected in parallel, providing an emitter coupled NPN gate. Transistors 42, 44 and 46 have their emitter electrodes connected in common through resistor 48 to terminal 51, which is connected to a source of direct current potential (not shown), which for purposes of this example will be assumed to be −5.2 volts. The collector of transistor 42 is connected to ground through resistor 50 and its base is connected to terminal 53, which is connected to a bias potential (not shown), which will be assumed to be −1.1 volts. The collector of transistor 44 is connected to the cathode electrode of a blocking diode 54, which has its anode electrode connected to ground. Also, the collector of transistor 44 is connected to resistor 56, which is connected to terminal 58. Terminal 58 is connected to a source of direct current potential (not shown), which will be assumed to be +6.0 volts. The base of transistor 44 is connected to the operational amplifier 22 through capacitor 32.

The collector electrode of transistor 46 is connected through resistor 56 to terminal 58, and its base electrode is connected to the strobe 16 via conductor 33.

The output of level translator 24 is controlled by a switching gate in the form of NPN transistor 60, which has its base connected to the collector electrodes of both transistors 44 and 46, its emitter connected to ground, and its collector connected to terminal 58 through resistor 62, and thus to the +6.0 volt source potential, and also to the read register 14 via conductor 35.

Thus, in general, transistor 42 of differential amplifier 40 will conduct only when its base is more positive than both the base of transistor 44 and the base of transistor 46. If the base of transistor 44 or the base of transistor 46 is more positive than the base of transistor 42, transistor 42 will be cutoff and the output transistor 60 will be held off by the conductive transistor, either transistor 44 or transistor 46. Transistors 44 and 46 thus function as a two input AND gate, requiring signals at the base of transistor 44 and at the base of transistor 46 which are more negative than the bias applied to the base of transistor 42, in order to switch transistor 60 to its conductive state, and drop the voltage applied to the register from +6.0 volts to ground. In other words, transistors 44 and 46 function as a two input AND gate for negative going current mode logic levels, and will output a negative going DTL level sufficient to trigger a DTL flip-flop.

Figures 3A, 3B, 3C:
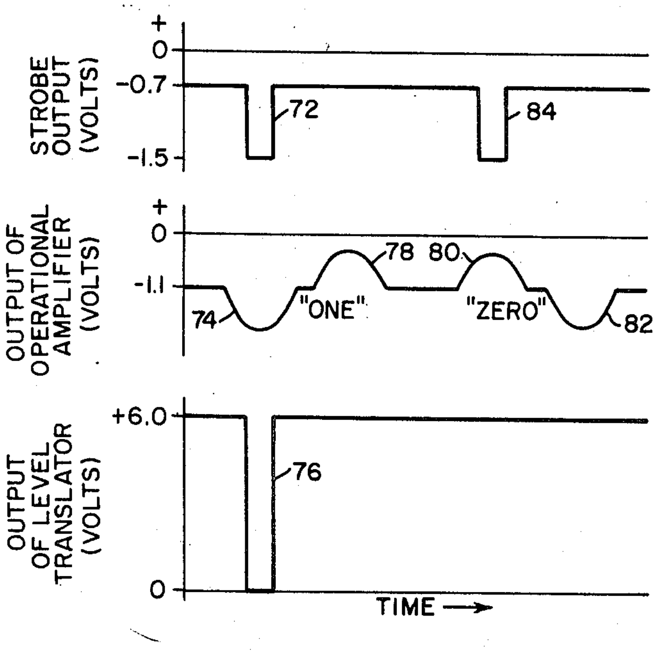
FIGS. 3A, 3B and 3C are graphs illustrating the relationships between the output voltages of certain of the functions of the memory sense amplifier shown in FIGS. 1 and 2.

FIGS. 3A, 3B and 3C are graphs which illustrate the relationship between the strobe voltage, the output voltage of the operational amplifier 22, and the output voltage of the level translator 24, respectively. The strobe voltage is at a level of −0.7 volt until providing a pulse, at which time the voltage changes to −1.5 volts. In the absence of a strobe pulse, the base of transistor 46 is less negative than the base of transistor 42, and transistor 46 will conduct and hold transistor 60 off. Thus, the output of level translator 24 will necessarily be +6.0 volts in the absence of a strobe pulse, regardless of the signals received from the operational amplifier. When the strobe pulse occurs, which is timed to occur simultaneously with the interrogated output of the operational amplifier, transistor 46 will be cut off because its base becomes more negative than the base of transistor 42. If the output of the operational amplifier 22 now makes the base of transistor 44 more negative than the base of transistor 42, both transistors 44 and 46 will be cut off, transistor 42 will switch to its conductive state, and transistor 60 will switch to its conductive state, dropping the voltage applied to the read register from +6.0 volts to substantially zero. Thus, referring to FIG. 3, if strobe pulse 72 occurs simultaneously with a pulse 74 from operational amplifier 22 which is more negative than the base of transistor 42, the output level of transistor 60 will provide a negative going pulse 76. As shown in FIG. 3B, a stored binary "one" appears as a negative going pulse 74 and then a positive going pulse 78, and a stored binary "zero" appears as a positive going pulse 80 and then a negative going pulse 82. Thus, by timing the strobe pulses to occur during the first pulse associated with each interrogation of the memory system, the level translator may be made to change its output level when a stored "one" is indicated. When a pulse, such as pulse 84 occurs when a stored "zero" is indicated, the base of transistor 44 is more positive than the base of transistor 42, keeping transistor 60 cutoff and the output voltage level of the level translator at +6.0 volts.

It should be noted from FIGS. 3A and 3B that the width of the strobe pulses 72 and 84 are narrow compared with the width of the output pulse envelope from the operational amplifier 22. This insures that the strobe pulse will be surrounded by the signal from the operational amplifier 22, and that the output signal from the operational amplifier will be at its peak during strobe time, minimizing the effects of any noise voltages on the sense line.

The reduction of the gain of the operational amplifier due to the increasing of its operating speed through increasing its bandwidth, has been offset by the zero level thresholding of the operational amplifier signals during strobe time. Zero level thresholding has been accomplished by connecting the bias voltage applied to the base of transistor 42, to the base of transistor 44 through resistor 30, which sets the DC level of both the base of transistor 42 and the base of transistor 44 at substantially the same magnitude, making the differential amplifier 40 extremely sensitive. Thus, even very small signals from the operational amplifier 22 will be detected by level translator 24, without requiring an additional stage of amplification. Resistor 30, which is the load resistor of the operational amplifier 22, in addition to connecting the bias at the base of transistor 42 to the base of transistor 44, provides isolation between these two points. The small negative going leading pulse 74 of the binary "one" signal, occurring during strobing pulse 72, will be sufficient to cause the level translator to output a negative going pulse 76, and the small positive going leading pulse 80 of the binary "zero" signal, occurring during strobing pulse 84, will be sufficient to insure that transistor 44 will remain conductive, and hold the output of the level translator 24 at +6.0 volts.

It should be noted that the capacitive coupling between operational amplifier 22 and the level translator 24, provided by capacitor 32, prevents the bias voltage from affecting the operation of the operational amplifier 22.

In summary, there has been disclosed a new and improvided memory sense amplifier for computer memory systems, which uses commercially available components, including two integrated circuits and four discrete conventional components, which takes advantage of the small space required by the integrated circuits and at the same time overcomes their disadvantages when used in a sense amplifier application, through negative feedback, zero level thresholding and capacitive coupling.

One of the integrated circuits is an operational amplifier, which has its bandwidth increased through negative feedback. The resulting loss of gain of the operational amplifier is offset by utilizing an integrated circuit current mode logic gate, which is constructed in a manner which makes it an extremely sensitive detector of small signals from the operational amplifier. Further, it also functions as a two input AND gate to allow the necessary strobing, and it further provides the function of shifting the CML voltage levels to DTL voltage levels for operating its associated flip-flop in the read register.

Since numerous changes may be made in the above described apparatus and different embodiments of the invention may be made without departing from the spirit thereof, it is intended that all matter contained in the foregoing description or shown in the accompanying drawings, shall be interpreted as illustrative, and not in a limiting sense.

We claim as our invention:

1. A sense amplifier for receiving signals from a sense line in a computer memory system and providing appropriate output signals for register means, comprising:

an operational amplifier having input terminals adapted for connection to a sense line in a computer memory system, and an output terminal, a level translator including first and second transistors each having base, collector, and emitter electrodes, means connecting said first and second transistors in a differential amplifier configuration, with the base electrodes of said first and second transistors being the first and second input sides of the differential amplifier, respectively, a third transistor having base, collector, and emitter electrodes, said third transistor being connected in parallel with said second transistor, with the base electrodes of said second and third transistors providing first and second input gates on the second input side of the differential amplifier, and an output gate having input and output terminals, the input terminal of said output gate being connected to the collector electrodes of said second and third transistors, and the output terminal of said output gate being adapted for connection to register means, means connecting the output terminal of said operational amplifier to the first input gate of the second input side of the differential amplifier, strobe means, the second input gate of the second input side of the differential amplifier being connected to said strobe means, biasing means connected between the first input side and the first input gate of the second input side of said differential amplifier, biasing said first input side and said first input gate to substantially the same magnitude, and blocking means connected between said biasing means and said operational amplifier, isolating said operational amplifier from said biasing means, the output gate of said level translator changing its operating state when the first and second input gates of the second input side of the differential amplifier receive signals simultaneously from said operational amplifier and said strobe means, respectively.

2. The sense amplifier of claim 1, including feedback means connected from the output terminal of the operational amplifier, to one of its input terminals.

3. The sense amplifier of claim 1 wherein the blocking means is a capacitor, which couples the output of the operational amplifier with the first input gate of the second input side of the differential amplifier.

4. The sense amplifier of claim 1 wherein the output gate is a transistor having base, collector, and emitter electrodes, with its base electrode being connected to the collector electrodes of the second and third parallel connected transistors, and its collector electrode connected to its output terminal.

5. The sense amplifier of claim 4 including a source of direct current potential connected across the collector and emitter electrodes of the output gate transistor.

References Cited

UNITED STATES PATENTS

| | | | |
|---|---|---|---|
| 3,231,762 | 1/1966 | Melhus | 307—235 |
| 3,287,574 | 11/1966 | Jenkins | 307—208 |
| 3,346,742 | 10/1967 | Aniano et al. | 307—235 |
| 3,413,492 | 11/1968 | Schneider | 307—218 XR |

STANLEY T. KRAWCZEWICZ, Primary Examiner

U.S. Cl. X.R.

307—218, 232, 235